United States Patent [19]

Lacey

[11] Patent Number: 4,699,416
[45] Date of Patent: Oct. 13, 1987

[54] LOG CARRYING APPARATUS

[76] Inventor: Meredith D. Lacey, 2516 Georgia St., Muskogee, Okla. 74401

[21] Appl. No.: 345,810

[22] Filed: Feb. 4, 1982

[51] Int. Cl.[4] .............................................. B65D 71/00
[52] U.S. Cl. ..................................... 294/152; 294/74
[58] Field of Search ............... 294/152, 153, 154, 156, 294/157, 159, 162, 164, 74, 75, 76, 67 E, 67 EA, 31.2

[56] References Cited

U.S. PATENT DOCUMENTS 3,143,266 8/1964 Imatake ............................... 294/152
4,022,507 5/1977 Marino .................................. 294/74

Primary Examiner—James B. Marbert
Attorney, Agent, or Firm—Head & Johnson

[57] ABSTRACT

A carrying apparatus comprising a pair of tubular or rod-like handles interconnected by a flat strap means having at least one longitudinal slit therein. Objects to be carried (such as firewood logs) are stacked on the flat strap means, after which the handles are elevated, and one is threaded through the slit and locked behind strap such that the strap means will compress around the load when elevated and carried by the other handle.

5 Claims, 7 Drawing Figures

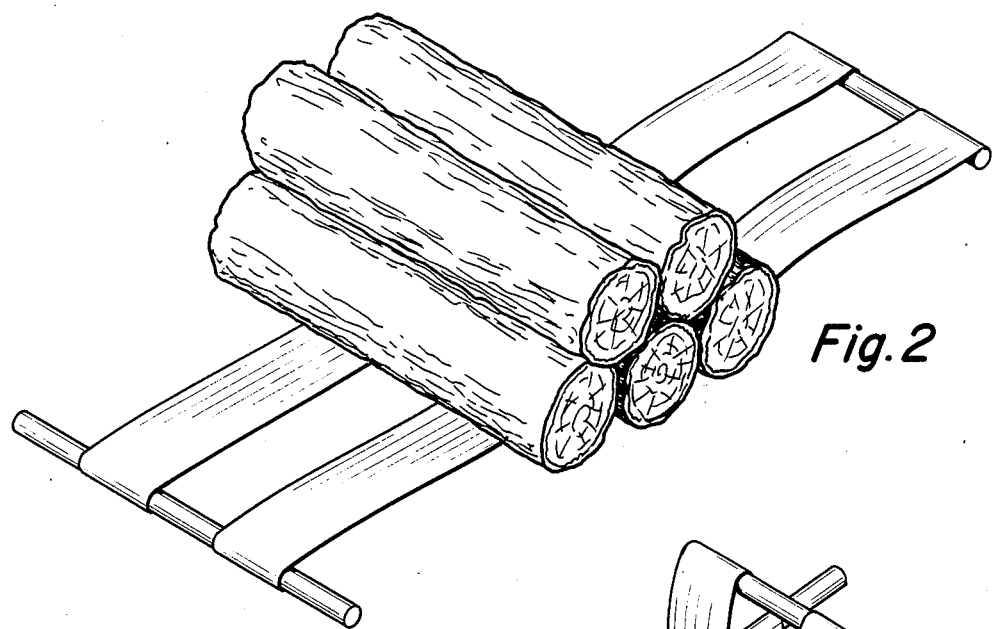
Fig. 2
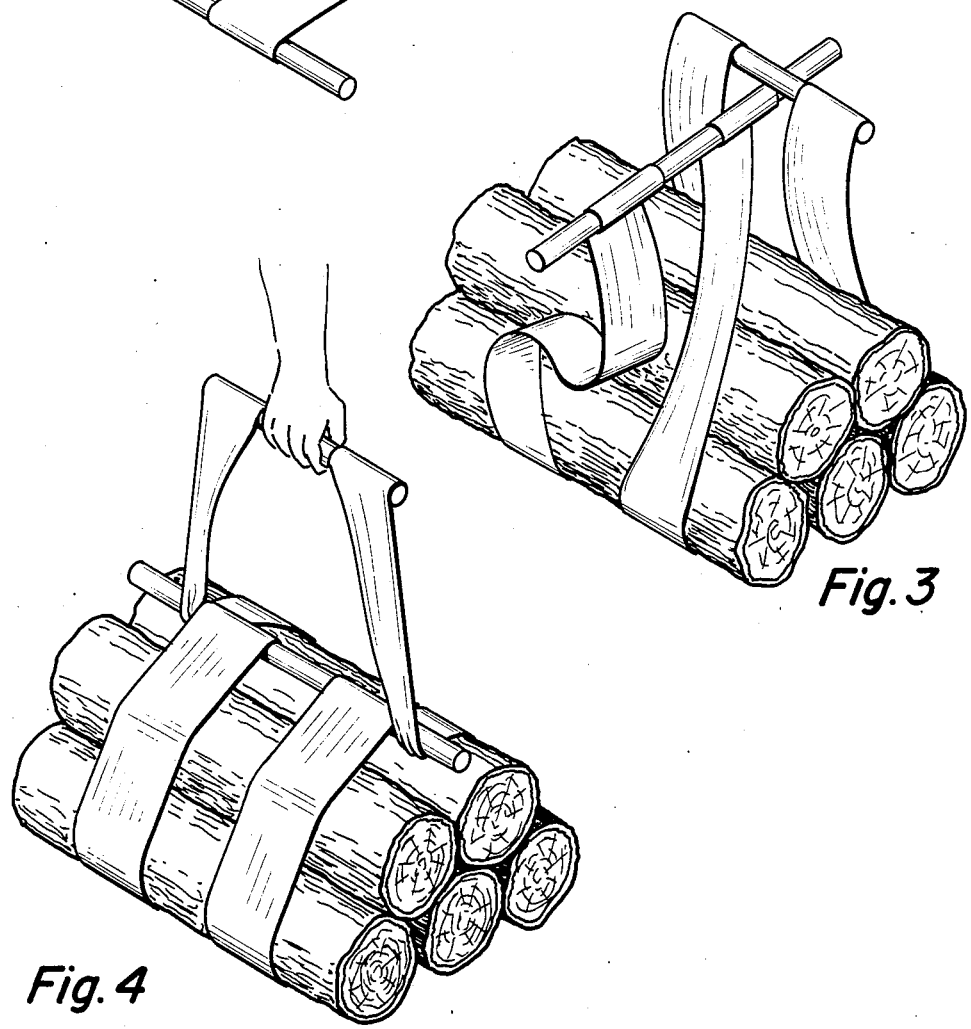
Fig. 3
Fig. 4

LOG CARRYING APPARATUS

BACKGROUND OF THE INVENTION

1. Field of the Invention

This present invention relates to improvements in trasporting heavy and cumbersome objects, and more particulrly, to an apparatus designed for lifting and carrying logs by human effort.

2. Description of the Prior Art

In the manual carrying of logs, or the like, it is common practice to utilize a pouch arrangement in cooperation with handle members of some sort. These devices can be further categorized into those in which the grasp of the hand provides the connection for closure of the pouch and those in which the handles are mechanically interconnected in some way so that the function of the grasp on the pouch is only to transport the logs and not to provide for closure of the pouch itself. Devices of the former type are disadvantageous in that the hand must grasp two handles in order to shut the pouch and thus secure the logs for carrying. This provides for an awkward and often unwieldy grasp, serving also to complicate any (human) attempt to walk in a balanced fashion and still deliver the logs to their destination. Devices of the latter type, while having only one handle, notriously utilize relatively intricate connection systems of hooks, holding members, or wires to secure the logs within the pouch. These devices are thus expensive in their manufacture and time is wasted in making the tedious connections before and after use. Thus, effort and expense are two major problems in the making and use of these devices.

SUMMARY OF THE INVENTION

I have discovered a carrying device which has been particularly designed and constructed for overcoming the foregoing disadvantages. The novel carrier is of compact and simple construction and comprises a strap means having at least one longitudinal slit therein and suitably adapted for allowing the placement of objects to be carried thereon. At one end of the strap means is provided a handle made of a suitable material which is operably connected to the strap means and which threads through the slit and locks behind the strap means, thus allowing the strap means to compress around and secure the load to be carried. At the opposite end of the strap members is provided a second handle made of a suitable material which is operably connected to the strap means and which serves as the handle for grasping when in use. The novel device is simple and efficient in operation and economical and durable in construction.

DESCRIPTION OF THE DRAWINGS

FIG. 2 is a working view of a carrying apparatus illustrating the preferable placement of the objects, logs in this case, to be carried by the apparatus.

FIG. 3 is a working view of a carrying apparatus illustrating the preferable method for threading the handle through the strap members.

FIG. 4 is a working view of a carrying apparatus illustrating the preferable locked in position of the handles for achieving the carrying the logs.

DESCRIPTION OF THE PREFERRED EMBODIMENT

Figure 1:
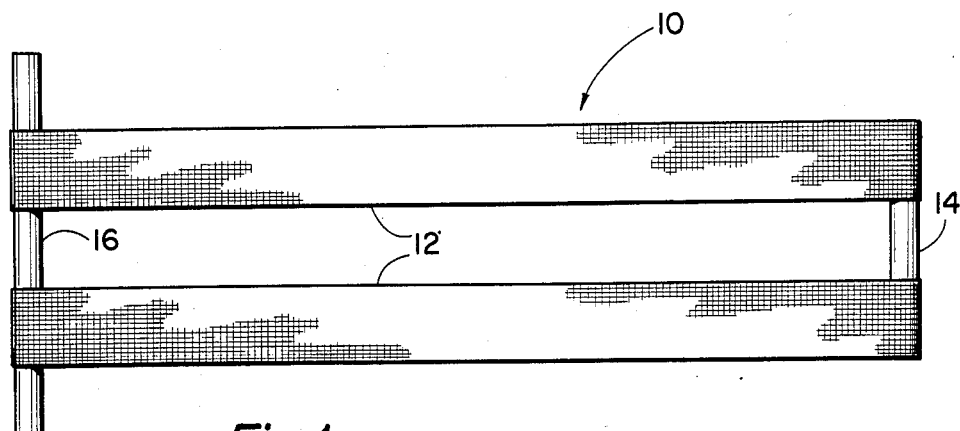
FIG. 1 is a front view of a carrying apparatus embodying the invention.

Referring to the drawings in detail, reference character 10 generally indicates a carrying apparatus. A pair of parallel strap members 12 made of a suitable material such as high tensile strength upholstery canvas, or the like is preferably spaced for receiving a quantity of logs, or the like. A first handle 14 made of a suitable material such as wood, or the like, is positioned at one end of the strap members 12 and is operably connected thereto to provide a secure attachment to the strap members 12 when grasped by the operator. A second handle 16 of length preferably greater than that of first handle 14 and made of a suitable material such as wood, but not limited thereto, is positioned at the opposite end of the strap members 12 and is operably connected thereto whereby the handle 16 may be threaded between the strap members 12 of the handle 14 and then positioned again parallel to the handle 14 such that the logs may be secured within the strap members for ultimate ease in carrying.

To use the carrying device illustrated in FIG. 1, the apparatus is laid out flat and the objects to be carried, such as firewood logs, are stacked perpendicular across the straps as illustrated in FIG. 2. The handles are then elevated over the stacked logs or the like and the longer handle is turned lengthwise so as to thread through the opening between the straps under the other handle as shown in FIG. 3. Having passed entirely between the straps, the longer handle is then re-oriented parallel to the shorter handle completing a loop around the logs. By lifting on the center of the smaller handle, see FIG. 4, the loop will inherently close around the logs as they are carried thus securing the load during transportation.

Having reached the desired destination the load is set down and the reverse process of threading the larger handle betweeen the straps of the smaller handle can usually be quickly by passed by merely pushing the straps attached to the smaller handle off of the portion of the longer handle that extends beyond the outside of the attached straps. A similar method of assembling the carrier may be used by merely pushing the straps attached to the smaller handle onto the portion of the longer handle that extends beyond the outside of the attached straps. This may be accomplished after the threaded handle has been elevated across the stack of logs and is already positioned parallel to the shorter handle. Thus the present invention affords the user the advantage of compressing (binding) the load during transportation yet quickly releasing the load upon setting it down, a combination of features felt to be novel and distinguishable from the prior art.

Figure 5:
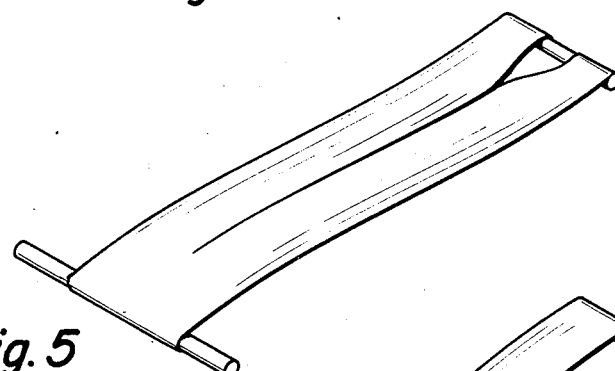
FIG. 5 is a view of an alternative carrying apparatus illustrating a solid strap with a suitably long slit for threading of the handle.
Figure 6:
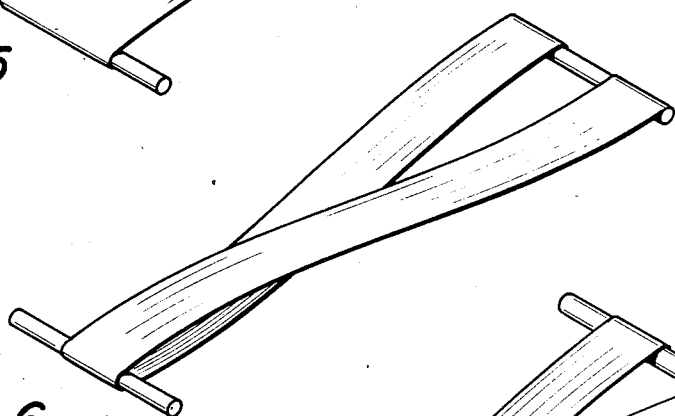
FIG. 6 is a view of an alternative carrying apparatus showing essentially one continuous strap folded around and attached to the center of one handle and attached at two separate positions on the other handle.
Figure 7:
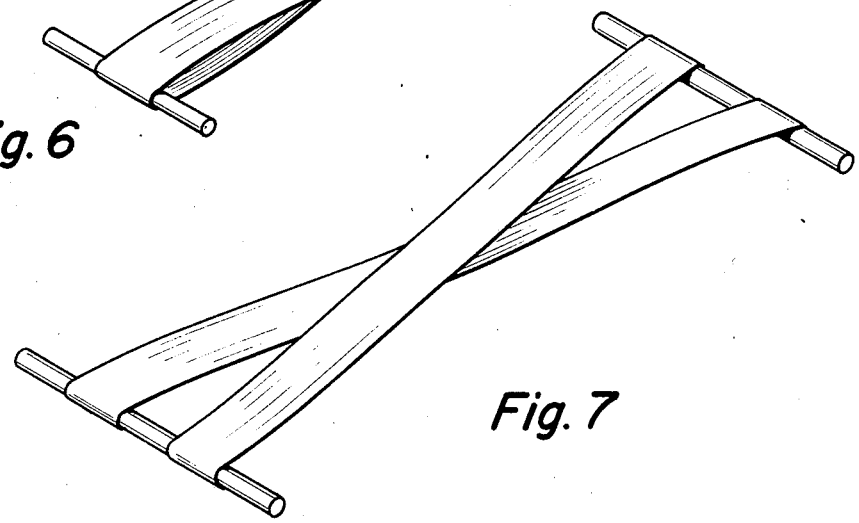
FIG. 7 is a view of an alternative carrying apparatus showing two criss-crossing strap members attached at separate positions on the handles.

There are various available alternatives to the parallel strap concept as has been mentioned herein and illustrated in FIGS. 1–4. The strap means may consist of one continuous piece of suitable material having at least one slit available at one end of the member for achieving the threading operation as shown in FIG. 5. FIG. 6 illustrates the use of two criss-crossing straps attached at separate positions of the handles. The method illustrated in FIG. 7 is perhaps the simplest and most economical in design because of its single continuous strap member folded around and attached both to the center of one handle and at two independent positions on the other handle. In principle, the strap means can be a plurality of parallel flexible members.

The strap members may be attached to the handles by any suitable means including stitching operations, gluing, tacking, or the like. In order to prohibit the strap members from slipping off the handle members, it may be advantageous to place a knob or other suitable fixtures at either end of the handles.

The strap members for wrapping around the objects to be carried can be made of essentially any material of sufficient tensile strength to withstand the intended load including, but not limited to, canvas, leather, rope, woven nylon, various heavy fabrics including carpet backing such as, polyethylene or polypropylene scrim and the like. Preferably a heavy woven fabric strapping commonly referred to as upholstery webbing is used. Similarly, the handles are to be made of essentially any material capable of carrying the load including such common structural materials as wood, metal, plastic, fiber reinforced plastic and the like. Preferably the handles are made of wood.

Having thus described and exemplified the preferred embodiments with a certain degree of particularity, it is manifest that many changes can be made within the details of construction, arrangement and fabrication of the components and their uses without departing from the spirit and scope of this invention. Therefore, it is to be understood that the invention is not limited to the embodiments set forth herein for purposes of exemplification, but is to be limited only by the scope of the attached claims, including the full range of equivalents to which each element thereof is entitled.

I claim:
1. A carrying apparatus comprising:
    (a) a strap means having at least one longitudinal slit therein, wherein said longitudinal slit is centrally located in said strap means and wherein said slit is separated into an opening at, at least, one end of said strap means;
    (b) a first rigid, rod-like handle means positioned at said one end of said strap means containing said opening in said separated slit and attached thereto whereby said handle means may be grasped at said opening and the carrying operation may be performed; and
    (c) a second rigid, rod-like handle means of sufficient length to extend across the width of said strap means and positioned at the other end of said strap means from that of said first handle means and attached thereto whereby said second handle means may be employed to wrap said strap means around an object to be carried and then said second handle means may be threaded through said slit in said strap means and turned perpendicular to said strap means to lock behind said strap means thus allowing said strap means to contract and compress around and secure the load to be carried.

2. A carrying apparatus of claim 1 wherein said strap means is a pair of parallel strap members and wherein said slit is the space between said parallel strap members.

3. A carrying apparatus of claim 1 wherein said strap means is a pair of criss-crossing strap members.

4. A carrying apparatus of claim 1 wherein said strap means is essentially one continuous strap member folded around and attached to the center of said second handle and attached at two separate positions on said first handle.

5. A carrying apparatus of claim 1 wherein said strap means is a plurality of parallel flexible members.

* * * * *